United States Patent [19]

Mohler

[11] Patent Number: 5,718,756
[45] Date of Patent: Feb. 17, 1998

[54] PROCESS FOR THE MANUFACTURE OF A STRUCTURED PAPER COATING

[75] Inventor: Howard Larry Mohler, Sterling, Ohio

[73] Assignee: ThieleKaolin Company, Sandersville, Ga.

[21] Appl. No.: 673,660

[22] Filed: Jun. 25, 1996

[51] Int. Cl.$^6$ ............................. C09C 3/00; C09C 3/08; C09C 3/10
[52] U.S. Cl. ..................... 106/486; 106/487; 501/148; 428/537.5; 162/181.8
[58] Field of Search ........................... 106/486, 487; 501/148; 162/181.1, 181.8, 183; 428/537.5

[56] References Cited

U.S. PATENT DOCUMENTS

| | | | |
|---|---|---|---|
| 4,738,726 | 4/1988 | Pratt et al. | 501/148 |
| 4,913,775 | 4/1990 | Langley et al. | 162/181.8 |
| 5,221,435 | 6/1993 | Smith, Jr. | 162/181.1 |
| 5,571,380 | 11/1996 | Fallon | 162/183 |

OTHER PUBLICATIONS

C.E. Coco; *The Effect of Protein Latex Ratio on Binder Migration, Runnability and Resultant Coated Board Properties,* 1984 TAPPI Coating Conference; pp. 131–141 (no month).

M. Whalen–Shaw; *Protein–Pigment Interactions for Controlled Rotogravure Printing Properties, Mechanistic and Structural Considerations;* 1984 TAPPI Coating Conference; pp. 11–20 (no month).

N. Gautam, A.J. Herbet & M.J. Whalen–Shaw; *A Comparison of the Wet Coating Structure of Three Traditional Coating Systems;* 1990 TAPPI Coating Conference; pp. 387–394 (no month).

Primary Examiner—Michael Marcheschi
Attorney, Agent, or Firm—Jones & Askew

[57] ABSTRACT

Structured paper coatings having good opacifying characteristics and good rheological properties are manufactured by a process which consists essentially of mixing a fine particle size kaolin clay pigment; water; at least one material selected from the group consisting of dispersing agents, thickening agents, pH adjusting agents, wetting agents, defoaming agents and mixtures thereof; and at least one cationic flocculant; and then adding a non-cationic binder material to the mixture under continued mixing conditions for a time sufficient to produce the structured paper coating.

12 Claims, No Drawings

PROCESS FOR THE MANUFACTURE OF A STRUCTURED PAPER COATING

TECHNICAL FIELD

This invention relates to a process for the manufacture of a structured paper coating. In a more specific aspect, this invention relates to a process for the manufacture of a structured paper coating which contains a fine particle size kaolin clay pigment, a cationic flocculant and a non-cationic binder material. This invention also relates to structured paper coatings manufactured by the process of this invention and to paperboard substrates which are coated with such structured paper coatings.

This invention is especially useful for those fine particle size kaolin clay pigments which have not previously been considered useful in certain paper coating applications.

BACKGROUND OF THE INVENTION

In the paper industry today, the use of recycled materials in forming paperboard substrates (or base stock) is significantly increasing due to environmental and/or cost concerns. However, the use of such recycled materials presents problems with regard to the substrate which generally must be masked (or covered) by a coating for best appearance.

An effective paperboard coating must be opaque, i.e., provide a certain opacity to the coated substrate. In other words, the opacifying characteristics of the paper coating are of great importance.

In addition to opacity, an effective paper coating must provide a smooth and glossy finish to the substrate, which results in a product having a uniform appearance.

For many years, the paper industry has used coatings which contain titanium dioxide as a pigment to provide opacity to the coated paper. However, kaolin clay pigments have increasingly been used to replace or at least partially replace titanium dioxide. Kaolin clay pigments provide good opacifying characteristics and also economic benefits when compared to titanium dioxide.

Kaolin is a naturally occurring, relatively fine, white clay which may be generally described as a hydrated aluminum silicate. Kaolin clay is widely used as a filler and a pigment in various materials, such as rubber and resins, and in various coatings, such as paints and coatings for paper.

The use of kaolin clay pigments in paper coatings serves, for example, to improve the opacity of the coated paper due to the absorption characteristics and light scattering ability of the kaolin clay pigment. Light scattering ability (or opacity) of the pigment can be estimated by the scattering coefficient as described in TAPPI, 1978, Vol. 61, No. 6, pages 78–80.

The light scattering ability, or opacifying characteristics, of kaolin clay may be enhanced by aggregating or structuring the minerals of the kaolin clay by chemical or thermal treatment.

The paper industry has recognized a potential problem when using kaolin clay pigments with certain binder materials. This potential problem is referred to as "pigment shock", which can create high Brookfield (low shear) viscosities. If not controlled, these high Brookfield viscosities can lead to gelling which renders the coating useless.

Pigment shock is believed to occur when the negatively-charged kaolin clay particles are blended with the positively-charged binder particles of conventional paper coatings. Binders are commonly used in the paper industry to bind the pigment(s) in a coating to the paper in a subsequent paper coating process.

The reaction of the kaolin clay particles and the binder particles (pigment shock as described above) causes the kaolin clay particles to flocculate. By controlling the flocculation, the kaolin clay particles become structured, and this structure provides the good opacifying characteristics of the paper coating.

Various researchers have reported on this type of pigment/binder reaction, such as M. Whalen-Shaw et al. in "Protein-Pigment Interactions for Controlled Rotogravure Printing Properties, Mechanistic and Structural Considerations", 1984 Coating Conference; C. E. Coco in "The Effect of Protein Latex Ratio on Binder Migration, Runnability and Resultant Coated Board Properties", 1984 Coating Conference; and Gautam et al. in "A Comparison of the Wet Coating Structure of Three Traditional Coating Systems", 1990 Coating Conference.

In addition to good opacifying characteristics, an effective paper coating must have good rheological properties to be usable in the process and equipment employed by the paper manufacturer.

In view of the foregoing discussion, there is a need in the paper industry for a cost effective paper coating which will provide good opacifying characteristics and good rheological properties.

SUMMARY OF THE INVENTION

Briefly described, the present invention provides a process for the manufacture of a structured paper coating. More specifically, this invention provides a process for such manufacture in which a fine particle size kaolin clay pigment is mixed with water and a cationic flocculant, after which a non-cationic binder material is added to the mixture, under continued mixing conditions for a time sufficient to produce a structured paper coating.

The present invention provides a process for the manufacture of a structured paper coating which has good opacifying characteristics and good rheological properties.

Additionally, the present invention provides a process in which conventional materials can be added to the mixture to produce certain desired effects. Examples of such additive materials are dispersing agents, thickening agents, pH adjusting agents, wetting agents, defoaming agents and mixtures thereof.

Depending upon the starting kaolin clay pigment, the cationic flocculant and the non-cationic binder material, the present invention also provides a process by which the coated substrate has a uniformity, gloss and smoothness which are either equivalent to or improved over conventional paper coatings.

The invention described in the application also provides (a) structured paper coatings having good opacifying characteristics and good rheological properties and (b) effective masking of paperboard substrates through use of the coatings produced by this invention.

Accordingly, an object of this invention is to provide paper coatings.

Another object of this invention is to provide paper coatings which have good opacifying characteristics and good rheological properties.

Another object of this invention is to provide paper coatings which contain fine particle size kaolin clay pigments, cationic flocculants and non-cationic binder materials.

Still another object of this invention is to provide paper coatings which can be used to produce coated paperboard substrates having uniformity, smoothness and gloss which are equivalent to or improved over paperboard substrates coated with conventional coatings.

Still another object of this invention is to provide structured paper coatings which have good opacifying characteristics and good rheological properties.

Still another object of this invention is to provide structured paper coatings which provide structured paper coatings which effectively mask the paperboard substrate.

Still another object of this invention is to provide structured paper coatings which contain fine particle size kaolin clay pigments, cationic flocculants and non-cationic binder materials.

Yet still another object of this invention is to provide a paperboard substrate which is coated with a structured paper coating having good opacifying characteristics and good rheological properties.

Yet still another object of this invention is to provide a paperboard substrate which is coated with a structured paper coating and which has uniformity, gloss and smoothness equivalent to or improved over paperboard substrates coated with conventional paper coatings.

These and other objects, features and advantages of this invention will become apparent from the following detailed description.

DETAILED DESCRIPTION OF THE INVENTION

In accordance with the present invention, a structured paper coating having good opacifying characteristics and good rheological properties is manufactured by a process which consists essentially of first mixing a fine particle size kaolin clay pigment; water; a material selected from the group consisting of dispersing agents, thickening agents, pH adjusting agents, wetting agents, defoaming agents and mixtures thereof; and a cationic flocculant; and then adding a non-cationic binder material to the mixture under continued mixing conditions for a time sufficient to produce the structured paper coating; wherein the cationic flocculant is present in an amount of less than 1.0 part by weight and the structured paper coating has a solids content of at least 40 percent by weight.

The structured paper coatings manufactured by the process of this invention can be used, due to their good rheological properties, in paper coating processes which use equipment and techniques conventional in the industry.

Additionally, the structured paper coatings manufactured by the process of this invention can be used, due to their good opacifying characteristics, to coat and mask paperboard substrates. This feature is especially advantageous when the paperboard substrate has been made from recycled materials.

By the term "good opacifying characteristics", we mean that the coatings of this invention can be effectively used in those applications when opacity is a desired feature, such as in paper coatings. By the term "good rheological properties", we mean that the viscosity or flow characteristics are such that these coatings can be worked, pumped and/or coated by means which are conventional in the paper industry.

The structured paper coatings of this invention contain at least one fine particle size kaolin clay pigment. This particular pigment provides cost advantages compared to certain other kaolin clay pigments. Of course, other kaolin clay pigments can be used with the fine particle size kaolin clay pigment.

In addition to the fine particle size kaolin clay pigment, the structured paper coatings of this invention also contain at least one cationic flocculant. Examples of effective flocculants include cationic proteinaceous materials such as soya protein; cationic starches; cationic fluorocarbons; and cationic polymers. Preferably, the cationic flocculant is present in an amount of less than 1.0 part by weight, based on the total weight of the kaolin clay pigment.

The structured paper coatings of this invention also contain at least one non-cationic binder material. Examples of such materials are starches, polymers, and proteins, provided that such materials are non-cationic (i.e., do not possess a positive charge).

The present invention also provides for the use of conventional additives in the manufacture of these structured paper coatings. Examples of such additives are dispersing agents, thickening agents, pH adjusting agents, wetting agents, defoaming agents and mixtures thereof. These additives may be present as a component of the kaolin clay pigment used to manufacture these coatings.

Suitable dispersing agents include sodium-based and lithium-based compounds (such as phosphates, silicates, salts of polyacrylic acids and mixtures thereof). Preferred dispersing agents include sodium polyacrylate and lithium polyacrylate.

Suitable thickening agents include sodium carboxymethylcellulose, xanthan gum (sold under the trademark KELZAN by Merck & Co., Kelco Division) and compounds sold under the trademarks AQUALON AQUD 3204 and 3262A by Aqualon Co. (a division of Hercules, Inc.). Preferred thickening agents are sodium carboxymethylcellulose and the above-described xanthan gum.

Suitable pH modifiers include soda ash, sodium carbonate, sodium hydroxide, lithium hydroxide, lithium carbonate, ammonium hydroxide and potassium hydroxide. Preferred pH modifiers are sodium carbonate, sodium hydroxide and lithium hydroxide. While the use of pH modifiers is not required, these compounds can be effectively used to achieve a slurry pH of from about 5–10, preferably about 6–8, for use of the slurry in the paper coating industry.

Suitable wetting agents include sodium lauryl sulfate, sodium dioctylsulphosuccinate, polyoxyethylene sorbitan monolaurate, fatty amine ethoxylate, long chain amine acids and long chain substituted betaine. Preferred wetting agents are non-ionic ethers, nonionic esters, sodium dioctylsulphosuccinate, polyoxyethylene sorbitan monolaurate and the long chain amine acids.

Suitable defoaming agents include those materials sold by Nalco Chemical Company (Naperville, Ill.) under the trademark NALCO 7561 and by Hercules Incorporated (Wilmington, Del.) under the trademark ADVANTAGE 831.

These additives are used in amounts which are conventional in the industry.

In the manufacture of the structured paper coatings of this invention, the fine particle size kaolin clay pigment, water and cationic flocculant are mixed for a time sufficient to achieve the desired degree of flocculation, generally at least about 5 minutes. To this mixture is then added a non-cationic binder material, and the mixing is continued for a time sufficient to produce the structured paper coating. Of necessity, this latter mixing time will vary depending upon the components used and the desired results but will generally require at least 5 minutes.

As generally discussed above, the anionic (negatively-charged) kaolin clay particles flocculate when mixed with the cationic (positively-charged) flocculant. This flocculation creates light scattering sites, which in turn improves opacity.

However, one must be careful to control the mixing time so that pigment shock or gelling is prevented or at least minimized. If pigment shock or gelling occurs to a significant degree, the Brookfield (low shear) viscosity of the paper coating will be too high for a coating process and, therefore, the paper coating will be of no value and must be discarded.

The amount of non-cationic binder material which can be used in the present invention will vary depending upon the desired paper coating.

The present invention is further illustrated by the following examples which are illustrative of certain embodiments designed to teach those of ordinary skill in this art how to practice this invention and to represent the best mode contemplated for carrying out this invention.

EXAMPLES 1-5

These examples demonstrate that the structured paper coatings of this invention can be used to provide coated paperboard substrates which have a uniformity (determined by visual appearance) which is equivalent to or improved over conventional paper coating systems.

Brookfield viscosities are determined using TAPPI method T-648 om—88 as revised in 1988. This method sets forth specific procedures for determination of low shear viscosity.

Example 1

To 100 parts of a kaolin clay mixture consisting of 90 parts of a coating clay sold by Thiele Kaolin Company (Sandersville, Ga.) under the trademark KAOBRITE and 10 parts of a calcined clay sold by Thiele Kaolin Company under the trademark KAOCAL is added 22 parts by weight of a non-cationic polyvinyl acetate latex binder sold by Rohm & Haas Company (Philadelphia, Pa.) under the trademark R&H 3103 and 0.5 parts by weight of a thickening agent sold by Kelco Company under the trademark KELGIN AC5. These components are mixed with water in a Premier brand dispersator to a uniform consistency, and the mixing is continued for at least 5 minutes.

Example 2

The procedure of Example 1 is followed, except that the starting kaolin clay mixture consists of 80 parts of the KAOBRITE product and 20 parts of the KAOCAL product.

Example 3

The procedure of Example 1 is followed, except that the starting kaolin clay mixture consists of 100 parts of a fine particle size kaolin clay. The KELGIN AC5 thickening agent is not added, but 0.25 parts by weight of a cationic proteinaceous flocculant sold by Ralston Purina Company (St. Louis, Mo.) under the trademark PROCOTE 300 is added to the mixture.

Example 4

The procedure of Example 3 is followed, except that the cationic proteinaceous flocculant is replaced by 0.20 parts by weight of a cationic starch flocculant sold by National Starch and Chemical Co. (Bridgewater, N.J.).

Example 5

The procedure of Example 3 is followed, except that the cationic proteinaceous flocculant is replaced by 0.0747 parts by weight of a cationic polymer flocculant sold by Nalco Chemical Company (Naperville, Ill.) under the trademark Nalco 7607.

Each of the paper coatings manufactured in Examples 1-5 is then applied (using a Dow brand coater, No. 5 and No. 4 rods) to an uncoated, recycled paperboard substrate having a diffuse brightness of 18.0. Each coating is applied to a coat weight of about 3.5 lbs./1000 square feet, and the coated board is dried at 75° F. and then conditioned for 24 hours.

Table I shows the coatings prepared in Examples 1-5 and certain properties of such coatings. The Brookfield viscosities show that the coatings of this invention (Examples 3-5) are equivalent to or improved over the conventional coatings (Examples 1-2).

The data shown in Table II confirms that the uniformity of boards coated with the products of this invention are equivalent to or improved over the uniformity of boards coated with conventional products.

TABLE II

|  | Raw Stock | Example 1 | Example 2 | Example 3 | Example 4 | Example 5 |
|---|---|---|---|---|---|---|
| Coat Weight (lbs./1000sq. ft.) | N/A | 3.5 | 3.7 | 3.6 | 3.5 | 3.8 |
| GE Brightness | 16.1 | 57.3 | 61.4 | 57.8 | 55.9 | 59.3 |
| Uniformity | N/A | 2 | 3 | 1.5 | 1 | 3 |

NOTE: With regard to Uniformity (visual appearance), a ranking of 1 is best.

TABLE I

|  | Example 1 | Example 2 | Example 3 | Example 4 | Example 5 |
|---|---|---|---|---|---|
| Kaolin Clay Pigment (parts by wt.) | 100 | 100 | 100 | 100 | 100 |
| Non-Cationic Binder Material (parts by wt.) | 22 | 22 | 22 | 22 | 22 |
| Cationic Flocculant (parts by wt.) | 0 | 0 | .25 | .20 | .0747 |
| Solids Content (%) | 63.4 | 63.6 | 63.6 | 63.6 | 63.1 |
| pH | 5.7 | 5.4 | 5.7 | 5.5 | 5.5 |
| Brookfield Viscosity (centipoises at 100 rpm) | 1164 | 1656 | 1284 | 860 | 1312 |

This invention has been described in detail with particular reference to certain embodiments, but variations and modifications can be made without departing from the spirit and scope of the invention as defined in the following claims.

What is claimed is:

1. A process for the manufacture of a structured paper coating having good opacifying characteristics and good rheological properties, wherein the process consists essentially of first mixing together a fine particle size kaolin clay pigment; water; an additive material selected from the group consisting of dispersing agents, thickening agents, pH adjusting agents, wetting agents, defoaming agents and mixtures thereof; and a cationic flocculant; and then adding a non-cationic binder material to the mixture under continued mixing conditions for a time sufficient to produce the structured paper coating; wherein the cationic flocculant is present in an amount of less than 1.0 part by weight based on the total weight of the kaolin clay pigment, and the structured paper coating has a solids content of at least 40 percent by weight.

2. A process as defined by claim 1 wherein the additive material is a dispersing agent.

3. A process as defined by claim 2 wherein the dispersing agent is sodium polyacrylate.

4. A process as defined by claim 2 wherein the dispersing agent is lithium polyacrylate.

5. A process as defined by claim 1 wherein the flocculant is selected from the group consisting of cationic proteinaceous materials, cationic starches, cationic fluorocarbons and cationic polymers.

6. A process as defined by claim 1 wherein the flocculant is a cationic soya protein.

7. A process as defined by claim 1 wherein the flocculant is a cationic starch.

8. A process as defined by claim 1 wherein the flocculant is a cationic proteinaceous material.

9. A process as defined by claim 1 wherein the binder material is a non-cationic polyvinyl acetate latex.

10. A process as defined by claim 1 wherein the binder material is a non-cationic styrene butadiene resin.

11. A structured paper coating having good opacifying characteristics and good rheological properties and consisting essentially of a mixture of a fine particle size kaolin clay pigment; water; an additive material selected from the group consisting of dispersing agents, thickening agents, pH adjusting agents, wetting agents, defoaming agents and mixtures thereof; a cationic flocculant; and a non-cationic binder material; wherein the cationic flocculant is present in an amount of less than 1.0 part by weight based on the total weight of the kaolin clay pigment, and the structured paper coating has a solids content of at least 40 percent by weight.

12. A paperboard substrate coated with a structured paper coating having good opacifying characteristics and good rheological properties, wherein the structured paper coating consists essentially of a mixture of a fine particle size kaolin clay pigment; water; an additive material selected from the group consisting of dispersing agents, thickening agents, pH adjusting agents, wetting agents, defoaming agents and mixtures thereof; a cationic flocculant; and a non-cationic binder material; wherein the cationic flocculant is present in an amount of less than 1.0 part by weight based based on the total weight of the kaolin clay pigment, and the structured paper coating has a solids content of at least 40 percent by weight.

* * * * *